May 28, 1957 — E. KORTE — 2,793,461

FISHING LURES

Filed July 22, 1953

INVENTOR.
Edward Korte
BY William B. Jaspert
Attorney.

United States Patent Office 2,793,461
Patented May 28, 1957

2,793,461

FISHING LURES

Edward Korte, Washington, Pa.

Application July 22, 1953, Serial No. 369,623

1 Claim. (Cl. 43—42.28)

This invention relates to new and useful improvements in fishing lures, and it is among the objects thereof to provide a lure which may be cast or trolled or used for spinning and which consists of a metal or plastic body slotted in the manner to receive the feather lure by inserting the same therein and by pressing the slotted portions in clamping engagement therewith.

The invention will become more apparent from a consideration of the accompanying drawing, constituting a part hereof, in which like reference characters designate like parts, and in which Fig. 1 is a side elevational view of a lure embodying the principles of this invention;

Figure 1:
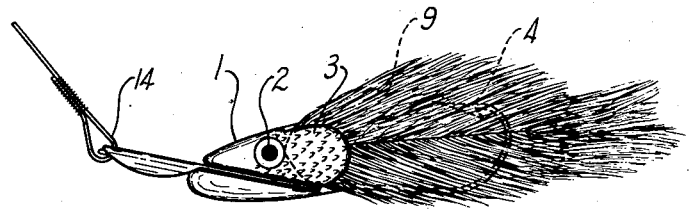

In the drawing the numeral 1 designates a body portion, preferably of lead, to supply the necessary weight for trolling, casting, or spinning, which is in the form of a fish head, frog, or crab, and made by casting. An eye 2 and scales 3 are embossed in the casting and colored as desired. Such cast lures have a hook 4 cast integrally therewith with an eye portion 5 for attaching to a swivel or leader.

Figure 2:
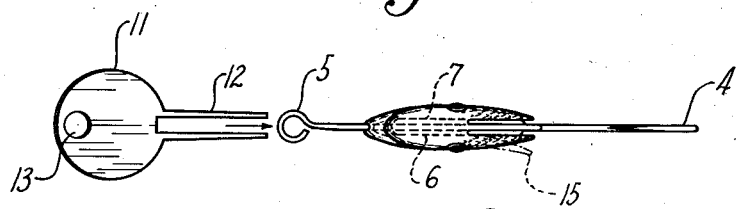
Fig. 2 is a top plan exploded view of a portion of the lure of Fig. 1.
Figure 3:
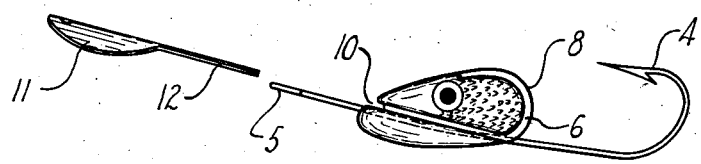
Fig. 3 is a side elevational view of the portions of the lure of Fig. 2.
Figure 4:
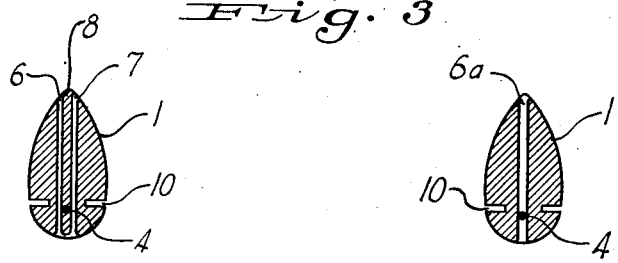
Fig. 4 is a cross-sectional view taken along the line 4—4, Fig. 3.

In accordance with the present invention the cast body 1 is provided with a pair of parallel slots 6 and 7, Fig. 4, running the height of the body, as shown in dotted lines in Fig. 2 and in the open portion thereof. The slots 6 and 7 are preferably cast in, leaving an upstanding central rib portion 8. These slots receive feathers 9, Fig. 1, or soft printed plastic, nylon fibers, hair, or rubber which are of a suitable color arrangement, and several feathers or materials or different colors may be used in combination in each of the slots. The feathers or other material 9 are inserted in the slots 6 and 7 and the body portion 1 is squeezed together to cause the walls of the slots 6 and 7 to intimately engage them to firmly hold them in position, with or without a waterproof cement.

A peripheral arcuate slot 10 may be provided for receiving a mouth piece which consists of a spoon-like member 11 having a bifurcated shank 12 which fits in the slot on both sides of the lure body to hold it firmly in position. The spoon 11 is provided with a perforation 13 for receiving a round ring or swivel or the end of a leader or spinner 14 as shown in Fig. 1. When the spoon 11 is in place, perforation 13 will be in register with the eye 5 of the hook to be secured against displacement when the spinner, ring, swivel or line is attached and cause the lure to swim and wobble side to side as a live minnow, the feathers vibrating as the body of a swinging fish. Action is controlled by the speed of retrieve from bottom to surface.

Figure 5:
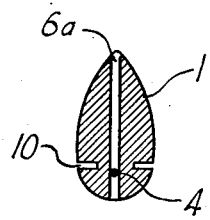
Fig. 5 is a similar view of a modified form of lure.

I have found that by utilizing two parallel slots 6 and 7 instead of a single slot, the feathers are firmly held against displacement once they are clamped in the slots, whereas if a single slot were employed, as shown in Fig. 5, there would be contact of the feathers themselves which does not lend itself to a firm gripping action as where double slots are employed.

The slotted portion of the body 1 may be bent away, as shown in dotted lines at 15, Fig. 2 of the drawing, to make the slots more accessible for receiving the feather or other lures. It is to be noted in Fig. 1 of the drawing that the feathers 9 cover both sides of the hook 4 and when the hook is placed in the manner shown in Fig. 1 it acts as a weedless bait because the feather protects the hook point from snagging. The peripheral slot 10 is at the same angle as the shank of the hook in the cast body 1 so that spoon 11 when inserted therein maintains the lure in the position shown in Fig. 1 while being trolled or cast through the water head so designed and balanced to always swim upright and wobble as a natural minnow or frog. It will not spin and put curl in the line.

It is evident from the foregoing description of the invention that fish lures made in accordance therewith may be attractively feathered without the need of tools and lend themselves to the replacement of feathers for different waters and different fishing conditions.

Although two embodiments of the invention have been herein illustrated and described, it will be evident to those skilled in the art that various modifications may be made in the details of construction without departing from the principles set forth and that the body may be made of soft plastic such as polyethylene instead of metal.

I claim:

In an artificial lure for fish, a cast body of a desired shape having the shank of the hook cast integrally within the body of the lure, said shank extending out at opposite ends of the body, said body having an arcuate peripheral slot extending at substantially the same plane as the shank of the hook for receiving the bifurcated ends of a spoon portion, said spoon having a perforation for registering with the eye of the hook to be fastened therewith and said body having a plurality of parallel vertical slots extending longitudinally of the cast body for receiving and clamping feather lures or the like.

References Cited in the file of this patent

UNITED STATES PATENTS

| | | |
|---|---|---|
| 1,490,389 | Hayes | Apr. 15, 1924 |
| 1,529,615 | Charpentier | Mar. 10, 1925 |
| 1,568,325 | Dewey | Jan. 5, 1926 |
| 1,583,199 | Taylor | May 4, 1926 |
| 1,927,441 | Korte | Sept. 19, 1933 |
| 2,005,554 | Milner | June 18, 1935 |
| 2,189,487 | Davenport | Feb. 6, 1940 |
| 2,565,049 | Sisco | Aug. 21, 1951 |
| 2,708,325 | Dillon | May 17, 1955 |